United States Patent [19]

Pircher et al.

[11] Patent Number: 4,645,720
[45] Date of Patent: Feb. 24, 1987

[54] ARMOUR-PLATE AND PROCESS FOR ITS MANUFACTURE

[75] Inventors: Hans Pircher, Mulheim an der Ruhr; Werner Bentz, Hattingen; Alfred Tegethoff, Ratingen, all of Fed. Rep. of Germany

[73] Assignee: Thyssen Stahl AG, Duisburg, Fed. Rep. of Germany

[21] Appl. No.: 667,037

[22] Filed: Nov. 1, 1984

[30] Foreign Application Priority Data

Nov. 5, 1983 [DE] Fed. Rep. of Germany ....... 3340031

[51] Int. Cl.$^4$ .......................... F41H 5/04; C21D 9/42
[52] U.S. Cl. ................. 428/683; 148/11.5 Q; 89/36.02
[58] Field of Search ........................ 428/683, 684, 685; 148/39, 11.5 Q, 127; 109/85; 89/36.02

[56] References Cited

U.S. PATENT DOCUMENTS

| 183,161 | 10/1876 | Haughian | 428/684 |
| 642,158 | 1/1900 | Russell | 109/85 |
| 1,869,208 | 7/1932 | McMillan | 428/683 |
| 1,934,520 | 11/1933 | Becker et al. | 109/85 |
| 2,034,278 | 3/1936 | Becket et al. | 428/683 |
| 2,249,629 | 7/1941 | Hopkins | 428/683 |
| 2,342,104 | 2/1944 | Holt | 148/39 |
| 2,438,759 | 3/1948 | Liebowitz | 148/39 |
| 2,562,467 | 7/1951 | Kinnear, Jr. | 428/683 |
| 3,694,174 | 9/1972 | Briggs | 428/683 |

FOREIGN PATENT DOCUMENTS

| 2106939 | 5/1972 | France | 428/683 |
| 108058 | 9/1978 | Japan | 428/683 |

OTHER PUBLICATIONS

"Irons and Steels", Metal Progress, Mid-Jun. 1978, pp. 19-21, 47-59.

Primary Examiner—Melvyn J. Andrews
Assistant Examiner—John J. Zimmerman
Attorney, Agent, or Firm—Sprung Horn Kramer & Woods

[57] ABSTRACT

Armour-plate comprising a two layer bonded subsequently heat-treated clad steel comprising an upper layer and a base layer wherein:

(a) the upper layer contains (in percent by weight)

| 0.30 to 0.80% | carbon |
| 0.10 to 0.80% | silicon |
| 0.40 to 1.20% | manganese |
| up to 0.015% | phosphorus |
| up to 0.015% | sulfur |
| 0.20 to 2.80% | chromium |
| 0.05 to 1.00% | molybdenum |
| 0.01 to 0.05% | aluminum |
| up to 0.40% | nickel | remainder iron including unavoidable impurities;

(b) said base layer contains (in percent by weight)

| 0.17 to 0.40% | carbon |
| 0.10 to 0.80% | silicon |
| 0.40 to 2.00% | manganese |
| up to 0.025% | phosphorus |
| up to 0.025% | sulfur |
| 0.10 to 1.50% | chromium |
| 0.05 to 1.50% | molybdenum |
| 0.01 to 0.05% | aluminum | remainder iron including unavoidable impurities the carbon content of said upper layer being substantially higher than the carbon content of said base material. The armour-plate is useful in vehicles such as tanks, personnel carriers, jeeps, ships and planes.

16 Claims, 1 Drawing Figure

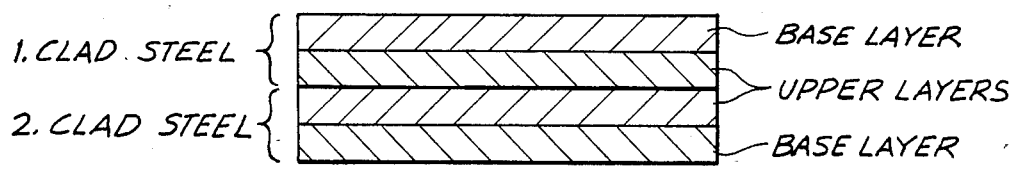
DOUBLE BOX

ARMOUR-PLATE AND PROCESS FOR ITS MANUFACTURE

BACKGROUND OF THE INVENTION

Field of the Invention

This invention relates to an armour-plate and to a process for its manufacture. More particularly, this invention relates to clad steel armour-plate in which one of the layers has a higher carbon content than the other.

DISCUSSION OF THE PRIOR ART

Armour-plates, to give effective protection from impacting projectiles, shells and the like, must, on the one hand, derive great strength from their hardness and, on the other, be sufficiently tough so as to have good deformation properties which make it possible to absorb the impact energy. For this reason, homogeneous armour-plate made of a uniformly composed material (mono plate), such as, for example, conventional high-carbon heat-treatable special steels, must not be made to be too hard. For this reason, the existing mono armour-plate has a maximum Brinell hardness 5/750 of about 530. If the hardness is any higher, any sheet metal produced from this very hard material is too brittle for use as armour-plate.

Such a process for producing an armour-plate where two sheets of steel are bonded with each other by cladding and the clad steel is subsequently heat-treated is known from German Pat. No. 2,142,360. In this process, after the cladding the two sheets of steel are heated to a temperature between 900° to 1050° C., are quenched or cooled down in air and are then subjected to a tempering treatment at a temperature between 200° to 650° C. The first sheet of steel, that is to say the projectile impact surface—which is the top layer of the armour-plate produced in this process—consists of 0.3–1.0% of C, 0.5–1.0% of Si, 0.1–1.0% of Mn, 3–10% of Cr. 0.5–3.0% of Mo, 0.2–1.0% of V, and iron as the remainder, and the second sheet of steel, that is to say that support sheet—which is the base material of the armour-plate—consists of 0.1–0.3% of C, 0.1–1.0% of Si, 0.1–2.0% of Mn, 2–10% of Ni, 0.2–2.0% of Cr, 0.2–2.0% of Mo, traces of V and iron as the remainder.

The clad steel armour-plate produced by the process previously disclosed by German Pat. No. 2,142,360, compared with these mono sheets, has the advantage that the projectile impact surface (top layer) is of greater hardness and the opposite side (base material), that is to say the support sheet of the clad steel, has more favorable ductility or toughness properties. If the suitability or quality of armour-plate is assessed on the basis of the protection afforded to vertical bombardment, it is found that the armour-plate produced by the process prior-disclosed in said patent specification can have a somewhat smaller minimum thickness than is necessary in the case of mono armour-plate. If, therefore, the design of the predetermined maximum weight of a physical entity made of armour-plate requires significantly lower metal thicknesses, then armour-plate as described in German Pat. No. 2,142,360 no longer guarantees protection from vertical bombardment. In this case, given otherwise identical conditions, the protection from bombardment may only be ensured at a bombardment angle of less than 90°. In an attempt to allow for this in the design, the components in the structure which are made of the armour-plate are arranged to be inclined.

All in all it has been found that even the clad steel armour-plate produced by the process prior-disclosed in German Pat. No. 2,142,360 does not yet guarantee the desired protection from vertical bombardment or from bombardment at an angle of less than 90°. This is the case in particular when, owing to design-dependent preconditions, the armour-plate used must be of low thickness, for example 8 mm or less, and the required protection from bombardment is not obtainable even if the appropriate components are arranged to be inclined. The armour-plates produced by this prior-disclosed process have a further disadvantage in that they contain appreciable proportions of alloying elements, such as, for example, chromium (up to a maximum of 10%) and vanadium (up to a maximum of 1.0%) in the top layer material and nickel (up to a maximum of 10%) in the base material. The heat treatment which is carried out in this process after the cladding and comprises hardening and tempering the clad steel makes it necessary to incorporate vanadium as an alloying element into the top layer material in order to prevent the hardness achieved in the top layer upon hardening the clad steel from disappearing again in the subsequent tempering treatment. The key features in this prior-disclosed process are a low carbon content (C=0.15%) for the base material and a subsequent tempering treatment at high temperature (520° or 525° C.). However, the two measures have the effect of producing good ductility or toughness properties and low Brinell hardness (about 300) of the base material. Compared with mono armour-plate, accordingly, the critical factors in this prior-disclosed process are primarily a somewhat higher hardness for the projectile impact surface and good ductility or toughness properties for the support sheet combined with significantly lower hardness.

It is the object of this invention, therefore, to provide an armour-plate of the type specified comprising an upper layer and a base layer made of better material so that the armour-plate can have a lower minimum thickness compared with the above-mentioned state of the art. It is a further object to provide such armour-plate wherein the base layer is weldable with ferritic electrodes.

SUMMARY OF THE INVENTION

Broadly, this invention contemplates a heat-treated clad steel plate comprising an upper layer and a base layer wherein
(a) the upper layer contains (in percent by weight)

| | |
|---|---|
| 0.30 to 0.80% | carbon |
| 0.10 to 0.80% | silicon |
| 0.40 to 1.20% | manganese |
| up to 0.015% | phosphorus |
| up to 0.015% | sulfur |
| 0.20 to 2.80% | chromium |
| 0.05 to 1.00% | molybdenum |
| 0.01 to 0.05% | aluminum |
| up to 0.40% | nickel | remainder iron including unavoidable impurities;
(b) said base layer contains (in percent by weight)

| | |
|---|---|
| 0.17 to 0.40% | carbon |
| 0.10 to 0.80% | silicon |
| 0.40 to 2.00% | manganese |

| | |
|---|---|
| up to 0.025% | phosphorus |
| up to 0.025% | sulfur |
| 0.10 to 1.50% | chromium |
| 0.05 to 1.50% | molybdenum |
| 0.01 to 0.05% | aluminum | remainder iron including unavoidable impurities, said upper layer having a substantially higher carbon content than the carbon content of said base layer.

The multi-clad armour steel plate of the invention is one preferably characterized in that the carbon content of said upper layer is at least about 0.10% by weight greater than that of said base layer.

It is an important feature of the invention that the particular importance is accorded not only the hardness properties of the upper layer, but also, in particular, the hardness characteristics of the base layer, i.e., the hardness of the base layer of the clad steel according to the invention should correspond to the hardness of known mono armour-plates used in practice. According to the invention, the hard base layer is used as a support and is clad on one side with an upper layer of greatest possible hardness. In contrast to the state of the art, such as described in German Pat. No. 2,142,360, the function of the base layer is no longer simply limited to nullifying the projectile or impact energy by plastic deformation as a result of its toughness properties. On the contrast, in accordance with the invention, the hardness of the base material is significantly increased and optimized in such a way that, on the one hand, it contributes as much as possible to resisting the penetration of a projectile and, on the other hand, it provides sufficient toughness generally to prevent brittle cracking or tearing of the material of the clad armour steel. The prevention of such brittle cracking or tearing is also due to the intimate bond achieved between the upper layer and the base layer. The impact or projectile energy is now essentially consumed by the deformation of the projectile itself and virtually no longer as a result of plastic deformation of the base material.

DESCRIPTION OF SPECIFIC EMBODIMENTS

The armour-plate of the invention is preferably one in which the base material contains (in percent by weight)

| | |
|---|---|
| 0.17 to 0.25% | carbon |
| 0.40 to 0.80% | silicon |
| 0.70 to 1.20% | manganese |
| up to 0.025% | phosphorus |
| up to 0.025% | sulfur |
| 0.50 to 1.00% | chromium |
| 0.20 to 0.60% | molybdenum |
| 0.01 to 0.05% | aluminum, | remainder iron including unavoidable impurities.
In a particularly desired embodiment, such base material contains (in percent by weight)

| | |
|---|---|
| 0.27 to 0.32% | carbon |
| 0.10 to 0.40% | silicon |
| 0.50 to 0.80% | manganese |
| up to 0.010% | phosphorus |
| up to 0.010% | sulfur |
| 1.00 to 1.50% | chromium |
| 0.10 to 0.30% | molybdenum |
| 0.01 to 0.05% | aluminum, | remainder iron including unavoidable impurities.

The clad armour-plate of the invention is preferably one in which the base layer and/or the upper layer additionally contained up to 0.008% by weight of boron and 0.03 to 0.20% titanium. Preferably, the base material additionally contains 0.01 to 0.12% by weight zirconium.

The armour-plate according to the invention can be characterized by the fact that neither the base layer nor the upper layer contains a substantial amount of vanadium.

The armour-plate of the invention as a result of the mode by which it is made and heat hardened is characterized in that the base layer has a hardness of at least 380 HB and the upper layer has a hardness of at least 130 HB greater than that of said base layer, but no more than 300 HB greater than the hardness of said base layer, preferably, no more than 150 to 250 HB greater.

Accordingly, the armour-plate according to the invention is characterized in that it preferably has a Brinell hardness greater than 600, preferably of 650 to 700, for the outer, very hard top layer and a Brinell hardness of at least 380, preferably 450 to 520, for the base material. Top layer and base material differ in Brinell hardness by at least 130, but at most by only 300, preferably by at most 150 to 250. All in all, this produces a better protection from bombardment than the armour-plate described in German Pat. No. 2,142,360, where the Brinell hardness of the outer projectile impact surface is about 600 and that of the base material is merely of the order of 300.

The hardness values both of the base material and of the top layer of the armour-plate according to the invention are set in optimal manner, and as a result the smallest possible minimum thickness of the armour-plate in terms of protection from vertical bombardment is achieved, when the base material and the top layer having the respective compositions according to the invention are bonded together in a special manner and are then heat-treated.

Armour-plate according to the invention can be provided by the steps of:

(a) providing an upper layer containing (in percent by weight):

| | |
|---|---|
| 0.30 to 0.80% | carbon |
| 0.10 to 0.80% | silicon |
| 0.40 to 1.20% | manganese |
| up to 0.015% | phosphorus |
| up to 0.015% | sulfur |
| 0.20 to 2.80% | chromium |
| 0.05 to 1.00% | molybdenum |
| 0.01 to 0.05% | aluminum |
| up to 0.40% | nickel | remainder iron including unavoidable impurities;
(b) providing a base layer containing (in percent by weight):

| | |
|---|---|
| 0.17 to 0.40% | carbon |
| 0.10 to 0.80% | silicon |
| 0.40 to 2.00% | manganese |
| up to 0.025% | phosphorus |
| up to 0.025% | sulfur |

| | |
|---|---|
| 0.10 to 1.50% | chromium |
| 0.05 to 1.50% | molybdenum |
| 0.01 to 0.05% | aluminum | remainder iron including unavoidable impurities, the carbon content of said upper layer being substantially higher than that of said base layer;

(c) cladding said upper layer to said base layer by rolling the same to end thickness, thereafter subsequently heating the clad steel to a temperature within the range from 880° to 980° C. by holding it at this temperature and, thereafter cooling the same down in such a way as to convert into martensite all of said upper layer and at least 75% of said base layer.

Preferably, the upper layer is clad to the base layer by explosive cladding with subsequent hot rolling of the laminated structure to the end thickness.

In producing clad armour-plate according to the invention, the thickness ratio of the upper layer to the base layer before cladding is chosen so as to be in the range from 30:70 to 70:30.

The armour-plate is preferably produced in that before the roll bonded cladding or after the explosion cladding is effected but before the subsequent hot rolling, the clad steel is inverted over itself to form a double box such that the upper layer is on the inside and the base layer is on the outside. Thereafter, the clad steel in the form of a sealed double box is subsequently hot rolled and heat-treated. In forming such a "double-box" two original upper layers are juxtaposed to one another as a result of which the base layers are on opposed sides of the "double box".

The clad steel following heat treatment can be cooled by the application of an oil such that the cooling takes place at a high rate. Alternatively, one can use water to effect cooling of clad steel in double box form.

Following the heat treatment and the cooling of the clad steel to convert the upper layer into martensite, a tempering temperature can be effected. The tempering is effected by heating the clad steel at a temperature within the range from 170° to 230° C. The steel is maintained at this temperature for a period of time and thereafter, subsequently cooled down to room temperature in still or moving air.

The "double box" arrangement discussed supra is particularly desired because this arrangement of the high hardness upper layer on the inside of the pack prevents any decarburization during the rolling and heat treatment, which impairs the protection against bombardment, while the base layer on the outsides is brought to the required level of hardness during the course of the heat treatment.

The clad steel of the invention is provided particularly in a form in which the final thickness thereof is less than 20 mm, preferably less than 15 mm.

The thickness ratio between top layer and base material in the two-layer clad steels according to the invention is preferably chosen as follows. In the clad steels having an end thickness of less than 20 mm, preferably less than 15 mm, the thickness ratio of top layer: base material is preferably within the range from 50:50 to 60:40. In the thicker clad steels with an end thickness of greater than 15 mm, preferably greater than 20 mm, which are not produced by the double box method, the thickness ratio is in contrast preferably within the range from 30:70 to 40:60.

It is a further significant economic advantage of the armour-plate according to the invention that the heat treatment can be restricted to one hardening operation. However, if additional tempering is carried out with in the temperature range from 170° to 230° C., this reduces the internal stresses in the hard spots without significantly reducting the hardness of the novel armour-plate which is essential for protection from bombardment. If necessary, this additional measure can be used to improve the processability of the armour-plate.

If the heat treatment is restricted to one hardening operation after the roll-bonded cladding or the explosive cladding and hot-rolling, the base layer and top layer are heated to a temperature within the range from 880° to 980° C., maintained at this temperature and then quenched from this temperature down to room temperature. The length of time the composite material, i.e., the clad steel, which may be in double box form, is held at the hardening temperature depends upon the time required to effect homogenization associated with the conversion of the structure into austenite, i.e., in particular the dissolution of carbides and the uniform concentration distribution of dissolved elements. Generally speaking, the clad steel is maintained at this temperature for 20 to 40 minutes, in particular about 30 minutes.

The subsequent quench from the hardening temperature preferably takes places in oil, since this is an advantageous way of avoiding any distortion of the rolled-out clad steel or of the base material and top layer rolled out in double box form. However, according to the invention the quenching can also be effected in or with water, by means of water jets applied at a high rate, or by means of a water-gas mixture. In this case, the clad steel of the invention is quenched in double box form, and the quench is accordingly restricted to clad steels having an end thickness of less than 20 mm, preferably less than 15 mm.

If the armour-plate according to the invention, i.e., the clad steel comprising base material and top layer, is, subsequent to the hardening, additionally tempered as well, primarily to obtain stress relaxation in the hard spots, the clad steel according to the invention or the double box formed by the clad steel is, according to the invention, heated to the tempering temperature within the range from 170° to 230° C. and is preferably held at that temperature for at least 40 minutes until the corresponding diffusion processes have taken place. Thereafter, the clad steel or the double box is cooled down to room temperature, preferably in still air, and finally in the case of the double box is split into its components.

The three following examples concerning the composition of the top layer and the base material, the rolled-bonded cladding, and the subsequent heat or hardening and tempering treatment serve to illustrate the invention:

EXAMPLE 1

(a) Top layer (clad steel side facing the bombardment): 0.53% of C, 0.36% of Si, 0.79% of Mn, 0.010% of P, 0.006% of S, 2.50% of Cr, 0.83% of Mo, 0.020% of Al, 0.25% of Ni, Fe as remainder.

(b) Base material (clad steel side facing away from the bombardment): 0.32% of C. 0.30% of Si, 0.55% of Mn, 0.012% of P, 0.003% of S, 1.40% of Cr, 0.28% of Mo, 0.0020% of B, 0.025% of Al, 0.10% of Ti, Fe as remainder.

The two-layer armour steel plate is produced by combining the two materials into a semi-finished product by explosive cladding. The thickness ratio of top layer to base material is set to 50:50. The pre-exploded semi-finished product is assembled to form a double box with a separating layer made of, for example, chromium oxide in such a way that the top layer material is on the inside and the base material is on the outside. The double box is rolled out in the rolling mix and is then hardened in the form of a sealed pack by heating the pack at 920° C. for 30 minutes and then quenching it in oil.

The hardened pack is subsequently split up. The two sheets of clad steel produced in this way have a nominal thickness of between 7.5 and 8.0 mm and Brinell hardness values of about 720 for the top layer and about 520 for the base material.

EXAMPLE 2

(a) Top layer (clad steel side facing the bombardment): 0.53% of C, 0.36% of Si, 0.79% of Mn, 0.010% of P, 0.006% of S, 2.50% of Cr, 0.83 of Mo, 0.020% of Al, 0.25% of Ni, Fe as remainder.

(b) Base material (clad steel side facing away from the bombardment): 0.17% of C, 0.57% of Si, 0.85% of Mn, 0.012% of P, 0.007% of S, 0.71% of Cr, 0.25% of Mo, 0.0020% of B, 0.036% of Al, 0.08% of Zr, 0.12% of Ti, Fe as remainder.

The two-layer armour steel plate is produced by combining the two materials into a semi-finished product by explosive cladding. The thickness ratio of top layer to base material is set to 60:40. The pre-exploded semi-finished product is assembled to form a double box with a separating layer in such a way that the top layer material is on the inside and the base material is on the outside. The double box is rolled out in the rolling mill and is then hardened in the form of a sealed pack by heating the pack at 920° C. for 30 minutes, quenching it in oil and then tempering at 180° C. for 1 hour with subsequent cooling down in air. The completed heat-treated pack is then split up. The two sheets of clad steel produced in this way have a nominal thickness of 7.5 mm and Brinell hardness values of about 700 for the top layer and around 400 for the base material.

EXAMPLE 3

(a) Top layer (clad steel side facing the bombardment): 0.53% of C, 0.36% of Si, 0.79% of Mn, 0.010% of P, 0.006% of S, 2.50% of Cr, 0.83% of Mo, 0.020% of Al, Fe as remainder.

(b) Base material (clad steel side facing away from the bombardment): 0.32% of C, 0.30% of Si, 0.55% of Mn, 0.012% of P, 0.003% of S, 1.40% of Cr, 0.28% of Mo, 0.0020% of B, 0.025% of Al, 0.10% of Ti, Fe as remainder.

The two-layer armour steel plate is produced by combining the two materials into a semi-finished product by explosive cladding. The thickness ratio of top layer to base material is set to 35:65. The pre-exploded semi-finished product is rolled out in a rolling mill to an end thickness of 25 mm and is then hardened by heating the clad steel at 920° C. for 30 minutes and then quenching it in oil. The sheet of clad steel produced in this way has a Brinell hardness of about 670 for the top layer and about 500 for the base material.

BRIEF DESCRIPTION OF DRAWING

The accompanying drawing shows a "double box" configuration discussed supra wherein clad steels are juxtaposed to one another such that the base layers are on the outside and sandwiched juxtaposed upper layers therewithin.

What is claimed is:

1. An armour plate comprising a two-layer bonded and heat-treated clad steel comprises an upper layer and a base layer wherein:

(a) said upper layer contains (in percent by weight)

| | |
|---|---|
| 0.30 to 0.80% | carbon |
| 0.10 to 0.80% | silicon |
| 0.40 to 1.20% | manganese |
| up to 0.015% | phosphorus |
| up to 0.015% | sulfur |
| 0.20 to 2.80% | chromium |
| 0.05 to 1.00% | molybdenum |
| 0.01 to 0.05% | aluminum |
| up to 0.40% | nickel | remainder iron including unavoidable impurities;

(b) said base layer contains (in percent by weight)

| | |
|---|---|
| 0.17 to 0.40% | carbon |
| 0.10 to 0.80% | silicon |
| 0.40 to 2.00% | manganese |
| up to 0.025% | phosphorus |
| up to 0.025% | sulfur |
| 0.10 to 1.50% | chromium |
| 0.05 to 1.50% | molybdenum |
| 0.01 to 0.05% | aluminum | remainder iron including unavoidable impurities, the carbon content of said upper layer being substantially higher than that of said base layer and the hardness of said base layer is at least 380 HB and wherein the difference in the hardness between said upper layer and said base layer is at least 130 HB, but not greater than 300 HB.

2. An armour plate according to claim 1 wherein the carbon content of said upper layer is at least 0.10 weight percent greater than that of said base layer.

3. An armour plate according to claim 2 wherein said base layer contains (in percent be weight)

| | |
|---|---|
| 0.17 to 0.25% | carbon |
| 0.40 to 0.80% | silicon |
| 0.70 to 1.20% | manganese |
| up to 0.025% | phosphorus |
| up to 0.025% | sulfur |
| 0.50 to 1.00% | chromium |
| 0.20 to 0.60% | molybdenum |
| 0.01 to 0.05% | aluminum, | remainder iron including unavoidable impurities.

4. An armour plate according to claim 2 wherein base layer contains (in percent by weight)

| | |
|---|---|
| 0.27 to 0.32% | carbon |
| 0.10 to 0.40% | silicon |
| 0.50 to 0.80% | manganese |
| up to 0.010% | phosphorus |
| up to 0.010% | sulfur |
| 1.00 to 1.50% | chromium |
| 0.10 to 0.30% | molybdenum |
| 0.01 to 0.05% | aluminum, | remainder iron including unavoidable impurities.

5. An armour plate according to claim 2 wherein said base layer and/or said upper layer additionally contains up to 0.008% of boron and 0.03 to 0.20 weight percent of titanium.

6. An armour plate according to claim 5 wherein both of said base layer and said upper layer additionally contain up to 0.008% by weight of boron and 0.03 to 0.20 weight percent of titanium.

7. An armour plate according to claim 2 wherein said base layer additionally contains 0.01 to 0.12% by weight of zirconium.

8. An armour plate according to claim 1 wherein the difference in the hardness between said upper layer and said base layer is between 130 and 150 to 250 HB.

9. A vehicle having a wall, said wall in the form of the armour plate of claim 1.

10. A vehicle according to claim 9 which is a tank, personnel carrier, plane or ship.

11. A process for forming an armour plate which comprises the steps of:
    (a) forming a first layer of steel containing (in percent by weight)

| | |
|---|---|
| 0.30 to 0.80% | carbon |
| 0.10 to 0.80% | silicon |
| 0.40 to 1.20% | manganese |
| up to 0.015% | phosphorus |
| up to 0.015% | sulfur |
| 0.20 to 2.80% | chromium |
| 0.05 to 1.00% | molybdenum |
| 0.01 to 0.05% | aluminum |
| up to 0.40% | nickel | remainder iron including unavoidable impurities;
    (b) forming a second layer containing (in percent by weight)

| | |
|---|---|
| 0.17 to 0.40% | carbon |
| 0.10 to 0.80% | silicon |
| 0.40 to 2.00% | manganese |
| up to 0.025% | phosphorus |
| up to 0.025% | sulfur |
| 0.10 to 1.50% | chromium |
| 0.05 to 1.50% | molybdenum |
| 0.01 to 0.05% | aluminum | remainder iron including unavoidable impurities,
    (c) disposing said first layer over said second layer so that said first layer constitutes an upper layer and said second layer constitutes a base layer;
    (d) cladding said upper layer to said base layer by:
        (1) cladding to end thickness by rolling or
        (2) explosive cladding with subsequent hot rolling to end thickness;
subsequently heating said clad steel to a temperature within the range from 880° to 980° C., maintaining the so heated clad steel at such temperature and thereafter, cooling the same down so as to convert into martensite all of said upper layer and at least about 75% of said base layer such that the hardness of said base layer is at least 380 HB and wherein the difference in the hardness between said upper layer and said base layer is at least 130 HB, but not greater than 300 HB.

12. A process according to claim 11 wherein the thickness ratio of said upper layer to said base layer is within the range from 30:70 to 70:30.

13. A process according to claim 11 wherein after said upper layer and base layer are juxtaposed to one another, the clad steel is formed into a double box such that upper layers are juxtaposed to one another and sandwiched within opposed base layers and the resultant assembly is formed into a sealed double box and subsequently hot rolled and heat-treated.

14. A process according to claim 11 wherein cooling is effected by applying oil to the so heated clad steel or by disposing the so heated clad steel in an oil bath.

15. A process according to claim 13 wherein cooling is effected by applying water to the so heated clad steel in double box form or by disposing the so heated clad steel in double box form in a water bath.

16. A process according to claim 11 wherein following cooling of the so heated clad steel the same is subjected to a subsequent tempering treatment comprising heating the clad heated and cooled clad steel to a temperature within the range from 170° to 230° C., holding it at this temperature for a period of time and thereafter, cooling the same down to room temperature in air.

* * * * *